(12) United States Patent
Qu et al.

(10) Patent No.: US 8,596,533 B2
(45) Date of Patent: Dec. 3, 2013

(54) RFID DEVICES USING METAMATERIAL ANTENNAS

(75) Inventors: Huyu Qu, San Jose, CA (US); Chen Feng, Morristown, NJ (US); Ynjiun Paul Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/211,575

(22) Filed: Aug. 17, 2011

(65) Prior Publication Data
US 2013/0043309 A1 Feb. 21, 2013

(51) Int. Cl.
*G06K 7/00* (2006.01)

(52) U.S. Cl.
USPC .......... 235/440; 235/462.46; 235/472.02; 340/572.7; 343/700 MS

(58) Field of Classification Search
USPC .......... 235/451, 492, 440, 462.45–462.46, 235/472.01–472.3; 340/572.2, 572.7; 343/700 MS
See application file for complete search history.

(56) References Cited

U.S. PATENT DOCUMENTS

| | | |
|---|---|---|
| 5,579,341 A | 11/1996 | Smith et al. |
| 5,812,605 A | 9/1998 | Smith et al. |
| 5,903,825 A | 5/1999 | Goode et al. |
| 6,167,099 A | 12/2000 | Rader et al. |
| 6,751,470 B1 | 6/2004 | Ella et al. |
| 6,911,945 B2 | 6/2005 | Korva |
| 6,937,196 B2 | 8/2005 | Korva |
| 6,958,729 B1 | 10/2005 | Metz |
| 6,961,544 B1 | 11/2005 | Hagstrom |
| 7,072,690 B2 | 7/2006 | Shin et al. |
| 7,161,357 B2 | 1/2007 | Lee et al. |
| 7,164,387 B2 | 1/2007 | Sievenpiper |
| 7,190,728 B2 | 3/2007 | Kawada et al. |
| 7,202,776 B2 | 4/2007 | Breed |
| 7,202,819 B2 | 4/2007 | Hatch |
| 7,218,678 B2 | 5/2007 | Katta et al. |
| 7,251,499 B2 | 7/2007 | Ella et al. |
| 7,265,731 B2 | 9/2007 | Vance et al. |
| 7,283,094 B2 | 10/2007 | Lee |

(Continued)

FOREIGN PATENT DOCUMENTS

| | | |
|---|---|---|
| EP | 2061285 A2 | 5/2009 |
| WO | WO-9814023 A1 | 4/1998 |

OTHER PUBLICATIONS

B.P. Otis, Y.H. Chee, R. Lu, N.M. Pletcher, J.M. Rabaey, "An Ultra-Low Power MEMS-Based Two-Channel Transceiver for Wireless Sensor Networks," (4 pages).

(Continued)

*Primary Examiner* — Tuyen K Vo
(74) *Attorney, Agent, or Firm* — Oliff & Berridge, PLC

(57) ABSTRACT

An EIR terminal can comprise a microprocessor, a memory communicatively coupled to the microprocessor, and a radio frequency identifier (RFID) reading device including an antenna having a composite right- and left-handed (CRLH) structure. The antenna can comprise one or more spatially separated conductive cell patches mounted on a dielectric substrate, a feed pad mounted on the dielectric substrate, one or more conductive feed lines connected to the feed pad, and one or more ground planes mounted on the dielectric substrate. One or more conductive feed lines can be spatially separated from one or more conductive cell patches. One or more conductive cell patches can be connected by one or more vias to one or more conductive via lines.

14 Claims, 8 Drawing Sheets

(56) References Cited

U.S. PATENT DOCUMENTS

| | | | |
|---|---|---|---|
| 7,307,331 B2 | 12/2007 | Kipnis et al. | |
| 7,333,067 B2 | 2/2008 | Hung et al. | |
| 7,368,311 B2 | 5/2008 | Tilmans et al. | |
| 7,423,599 B2 | 9/2008 | Li et al. | |
| 7,446,717 B2 | 11/2008 | Hung et al. | |
| 7,466,274 B2 | 12/2008 | Lin et al. | |
| 7,586,387 B2 | 9/2009 | Van Delden | |
| 7,592,957 B2 | 9/2009 | Achour et al. | |
| 7,617,342 B2 | 11/2009 | Rofougaran | |
| 7,629,929 B2* | 12/2009 | Son et al. | 343/700 MS |
| 7,696,929 B2 | 4/2010 | Kaneda | |
| 7,741,965 B2 | 6/2010 | Lai et al. | |
| 7,750,435 B2 | 7/2010 | Rofougaran et al. | |
| 7,764,232 B2 | 7/2010 | Achour et al. | |
| 7,795,700 B2 | 9/2010 | Rofougaran et al. | |
| 7,809,329 B2 | 10/2010 | Rofougaran et al. | |
| 7,835,157 B2 | 11/2010 | Tilmans et al. | |
| 7,839,216 B2 | 11/2010 | Alidio et al. | |
| 7,839,236 B2 | 11/2010 | Dupuy et al. | |
| 7,847,739 B2 | 12/2010 | Achour et al. | |
| 7,855,696 B2 | 12/2010 | Gummalla et al. | |
| 7,874,483 B2 | 1/2011 | Wang et al. | |
| 7,885,600 B2 | 2/2011 | Rofougaran et al. | |
| 7,893,790 B2 | 2/2011 | Van Delden | |
| 7,899,394 B2 | 3/2011 | Rofougaran et al. | |
| 7,903,724 B2 | 3/2011 | Rofougaran et al. | |
| 7,908,420 B2 | 3/2011 | Rofougaran et al. | |
| 2002/0055368 A1 | 5/2002 | Lee | |
| 2002/0183013 A1 | 12/2002 | Auckland et al. | |
| 2004/0249915 A1 | 12/2004 | Russell | |
| 2005/0128152 A1 | 6/2005 | Milosavljevic | |
| 2005/0156796 A1 | 7/2005 | Nysen | |
| 2005/0271133 A1 | 12/2005 | Waxman | |
| 2006/0025102 A1 | 2/2006 | Kipnis et al. | |
| 2006/0070089 A1 | 3/2006 | Shoaib et al. | |
| 2006/0128332 A1 | 6/2006 | van Rooyen et al. | |
| 2006/0135084 A1 | 6/2006 | Lee | |
| 2006/0261821 A1 | 11/2006 | Lee et al. | |
| 2006/0261938 A1 | 11/2006 | Lai et al. | |
| 2006/0267844 A1* | 11/2006 | Yanagi et al. | 343/700 MS |
| 2006/0273176 A1* | 12/2006 | Audebert et al. | 235/451 |
| 2006/0279446 A1 | 12/2006 | Wang et al. | |
| 2007/0060089 A1 | 3/2007 | Owen et al. | |
| 2007/0080867 A1* | 4/2007 | Son et al. | 343/700 MS |
| 2007/0257847 A1 | 11/2007 | Su et al. | |
| 2008/0001723 A1* | 1/2008 | Schuessler | 340/10.51 |
| 2008/0042847 A1 | 2/2008 | Hollister et al. | |
| 2008/0048917 A1 | 2/2008 | Achour et al. | |
| 2008/0076383 A1 | 3/2008 | Barrett et al. | |
| 2008/0107213 A1 | 5/2008 | Gupta et al. | |
| 2008/0150807 A1 | 6/2008 | Lin et al. | |
| 2008/0150829 A1 | 6/2008 | Lin et al. | |
| 2008/0157897 A1 | 7/2008 | Tilmans et al. | |
| 2008/0181186 A1 | 7/2008 | Rofougaran et al. | |
| 2008/0181287 A1 | 7/2008 | Rofougaran et al. | |
| 2008/0182613 A1 | 7/2008 | Rofougaran et al. | |
| 2008/0237341 A1 | 10/2008 | Fleck et al. | |
| 2008/0258981 A1 | 10/2008 | Achour et al. | |
| 2008/0258993 A1 | 10/2008 | Gummalla et al. | |
| 2008/0278370 A1 | 11/2008 | Lachner et al. | |
| 2008/0297404 A1 | 12/2008 | Lin et al. | |
| 2009/0006677 A1 | 1/2009 | Rofougaran et al. | |
| 2009/0024550 A1 | 1/2009 | Wynn et al. | |
| 2009/0028082 A1 | 1/2009 | Wynn et al. | |
| 2009/0032592 A1 | 2/2009 | Christensen | |
| 2009/0033359 A1 | 2/2009 | Rofougaran et al. | |
| 2009/0036067 A1 | 2/2009 | Rofougaran et al. | |
| 2009/0037627 A1 | 2/2009 | Rofougaran et al. | |
| 2009/0058734 A1 | 3/2009 | Ali et al. | |
| 2009/0067388 A1 | 3/2009 | van Rooyen et al. | |
| 2009/0073065 A1 | 3/2009 | Jordan | |
| 2009/0074106 A1 | 3/2009 | See et al. | |
| 2009/0115549 A1 | 5/2009 | Lee | |
| 2009/0121951 A1 | 5/2009 | Kaneda | |
| 2009/0128446 A1 | 5/2009 | Gummalla et al. | |
| 2009/0135087 A1 | 5/2009 | Gummalla et al. | |
| 2009/0148074 A1 | 6/2009 | Xu et al. | |
| 2009/0160575 A1 | 6/2009 | Dupuy et al. | |
| 2009/0160578 A1 | 6/2009 | Achour | |
| 2009/0167457 A1 | 7/2009 | Melde et al. | |
| 2009/0180403 A1 | 7/2009 | Tudosoiu | |
| 2009/0213012 A1* | 8/2009 | Jiang et al. | 343/700 MS |
| 2009/0218657 A1 | 9/2009 | Rofougaran et al. | |
| 2009/0219213 A1 | 9/2009 | Lee et al. | |
| 2009/0227205 A1 | 9/2009 | Rofougaran et al. | |
| 2009/0245146 A1 | 10/2009 | Gummalla et al. | |
| 2009/0251385 A1 | 10/2009 | Xu et al. | |
| 2009/0285135 A1 | 11/2009 | Rousu et al. | |
| 2009/0289737 A1 | 11/2009 | Itoh et al. | |
| 2009/0295473 A1 | 12/2009 | Dupuy et al. | |
| 2009/0295483 A1 | 12/2009 | Alidio et al. | |
| 2009/0295660 A1 | 12/2009 | Xu et al. | |
| 2009/0316612 A1 | 12/2009 | Poilasne et al. | |
| 2009/0322490 A1 | 12/2009 | Kung et al. | |
| 2009/0323783 A1 | 12/2009 | Buris et al. | |
| 2010/0022195 A1 | 1/2010 | Rofougaran et al. | |
| 2010/0045554 A1 | 2/2010 | Xu et al. | |
| 2010/0060544 A1 | 3/2010 | Penev et al. | |
| 2010/0073254 A1 | 3/2010 | Lee et al. | |
| 2010/0077115 A1 | 3/2010 | Rofougaran et al. | |
| 2010/0079347 A1 | 4/2010 | Hayes et al. | |
| 2010/0109805 A2 | 5/2010 | Achour | |
| 2010/0109971 A2 | 5/2010 | Gummalla et al. | |
| 2010/0109972 A2 | 5/2010 | Xu et al. | |
| 2010/0109943 A2 | 5/2010 | Gummalla et al. | |
| 2010/0117908 A2* | 5/2010 | Lee et al. | 343/700 MS |
| 2010/0123635 A1* | 5/2010 | Lopez et al. | 343/722 |
| 2010/0127085 A1 | 5/2010 | Yamagajo et al. | |
| 2010/0157858 A1 | 6/2010 | Lee et al. | |
| 2010/0171563 A1 | 7/2010 | Dupuy et al. | |
| 2010/0176880 A2 | 7/2010 | Dupuy et al. | |
| 2010/0207703 A1 | 8/2010 | Dupuy et al. | |
| 2010/0225554 A1 | 9/2010 | Huang et al. | |
| 2010/0231464 A1 | 9/2010 | Huang et al. | |
| 2010/0231470 A1 | 9/2010 | Lee et al. | |
| 2010/0232474 A1 | 9/2010 | Rofougaran et al. | |
| 2010/0238075 A1 | 9/2010 | Pourseyed | |
| 2010/0238081 A1 | 9/2010 | Achour et al. | |
| 2010/0276498 A1 | 11/2010 | Rofougaran et al. | |
| 2010/0283692 A1 | 11/2010 | Achour et al. | |
| 2010/0283705 A1* | 11/2010 | Achour et al. | 343/844 |
| 2010/0285634 A1 | 11/2010 | Rofougaran et al. | |
| 2011/0026624 A1 | 2/2011 | Gummalla et al. | |
| 2011/0039501 A1 | 2/2011 | Achour et al. | |
| 2011/0050364 A1 | 3/2011 | Achour | |
| 2011/0066774 A1 | 3/2011 | Rofougaran et al. | |
| 2011/0068873 A1 | 3/2011 | Alidio et al. | |
| 2011/0095950 A1 | 4/2011 | Yu | |
| 2011/0095964 A1 | 4/2011 | Pathak et al. | |
| 2011/0109402 A1 | 5/2011 | Dupuy et al. | |
| 2011/0136457 A1 | 6/2011 | Yu | |
| 2011/0148586 A1 | 6/2011 | Anderson et al. | |
| 2011/0153349 A1 | 6/2011 | Anderson et al. | |
| 2011/0174877 A1 | 7/2011 | Fleck et al. | |
| 2012/0306698 A1* | 12/2012 | Warnick et al. | 342/372 |

OTHER PUBLICATIONS

C.T.- C Nguyen, "Vibrating RF MEMS for Low Power Communications (invited)," Proceedings, 2002 MRS Fall Meeting, Boston, Massachusetts, Dec. 2-6, 2002, pp. J12.1.1-J2.1.12 (12 pages).

European Patent Office, European Patent Application No. 10191449. 1, Communication Extended Search Report, dated Feb. 21, 2011 (11 pages).

European Patent Office, Partial European Search Report, European Patent Application No. 10176444.7, dated Feb. 11, 2011 (8 pages).

Hawaii International Conference on, IEEE, Piscataway, NJ, USA, Dynamic Dispatching and Transport Optimization—Real-World Experience with Perspectives on Pervasive Technology Integration, dated Jan. 5, 2009 (9 pages).

S. Lee and C.T. -C Nguyen, "Influence of Automatic Level Control on Micromechanical Resonator Oscsillator Phase Noise," proceedings, 2003 IEEE Int. Frequency Control Symposium, Tampa, Florida, May 5-8, 2003, pp. 341-349. (9 pages).

(56) References Cited

OTHER PUBLICATIONS

State Intellectual Property Office, P.R. China, Notice of Amendment, Chinese Application No. 201010544113.X, Dated Dec. 7, 2010, (2 pages).
www.nano.gatech.edu/news/release.php, Georgia Institute of Technology: Nanoscience and Nanotechnology, "Researchers Win $3.5 Million to Improve Wireless," Website, Aug. 5, 2010, (3 pages).
U.S. Appl. No. 12/621,914 filed with the United States Patent and Trademark Office Nov. 19, 2009.
U.S. Appl. No. 12/567,158 filed with the United States Patent and Trademark Office Nov. 19, 2009 (35 pages).
U.S. Appl. No. 13/211,555, filed with the United States Patent and Trademark Office Aug. 17, 2011 (41 pages).
U.S. Appl. No. 13/211,568, filed with the United States Patent and Trademark Office, Aug. 17, 2011 (35 pages).
EPC Global, Specification for RFID AIR Interface, dated Jan. 31, 2005 (94 pages).
European Patent Office, European Search Report, European Patent Application No. 10176444.7, dated Jun. 6, 2011 (5 pages).
Dec. 20, 2012 Communication Pursuant to Article 94(3) EPC in European Application No. 12179122.2-2210.
European Search Report dated Dec. 12, 2012 in European Application No. 12179122.2-2210.
Veselago et al.; "Negative Refractive Index Materials;" Journal of Computational and Theoretical Nanoscience; vol. 3, No. 2, pp. 1-30; 2006.
Elsadek; "Microstrip Antennas for Mobile Wireless Communication Systems;" Mobile and Wireless Communications Network Layer and Circuit Level Design; Intech; Chapter 9; Jan. 1, 2010; www.intechopen.com.

* cited by examiner

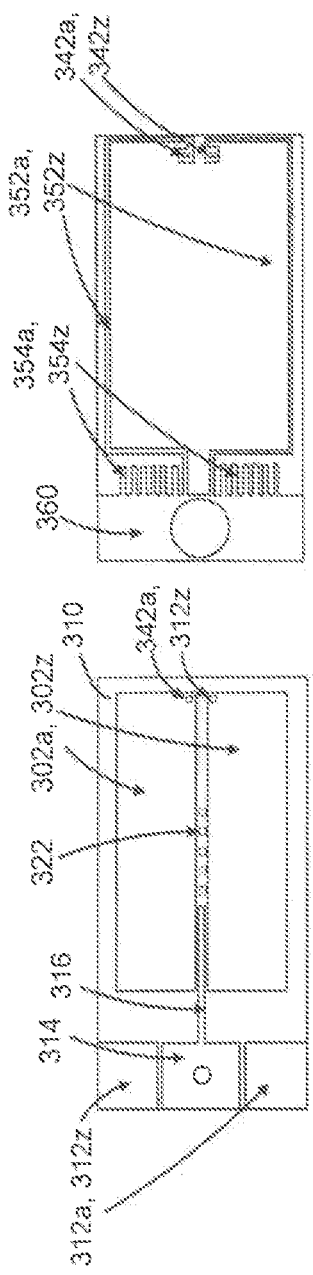

RFID DEVICES USING METAMATERIAL ANTENNAS

FIELD OF THE INVENTION

The invention is generally related to radio frequency identifier (RFID) devices and is specifically related to RFID tags and RFID reading devices using metamaterial antennas.

BACKGROUND OF THE INVENTION

RFID methods are widely used in a number of applications, including smart cards, item tracking in manufacturing and retail, etc. An RFID tag can be attached, e.g., to a retail item. An encoded information reading (EIR) terminal deployed at the cashier's desk can be equipped with an RFID reader to read and/or modify the memory of an RFID tag attached to a retail item.

SUMMARY OF THE INVENTION

There is provided an encoded information reading (EIR) terminal comprising a microprocessor, a memory communicatively coupled to the microprocessor, a radio frequency identifier (RFID) reading device. The RFID reading device can be configured to output raw message data containing an encoded message and/or output decoded message data corresponding to an encoded message. The RFID reading device can comprises an antenna having a composite right- and left-handed (CRLH) structure. The antenna can comprise one or more spatially separated conductive cell patches mounted on a dielectric substrate, a feed pad mounted on the dielectric substrate, one or more conductive feed lines connected to the feed pad, and one or more ground planes mounted on the dielectric substrate. One or more conductive feed lines can be spatially separated from one or more conductive cell patches. One or more conductive cell patches can be connected by one or more vias to one or more conductive via lines.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4-8 illustrate various embodiments of multiple cell metamaterial (MTM) antennas.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided an encoded information reading (EIR) terminal comprising a radio frequency identifier (RFID) reading device. The EIR terminal can be configured to read RFID tags containing encoded messages. In one embodiment, the EIR terminal can be configured to read an RFID tag containing an encoded message and output raw message data containing the encoded message. In another embodiment, the EIR terminal can be configured to read an RFID tag containing an encoded message and output decoded message data corresponding to the encoded message.

Various embodiments of the EIR terminal can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing an RFID tag in the card. Item tracking can be implemented by placing an RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

Figure 1A:
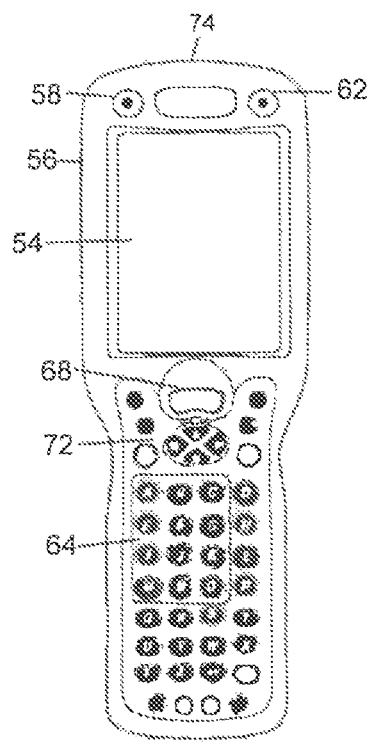
FIGS. 1a-1c schematically illustrate one embodiment of an EIR terminal.

One embodiment of EIR terminal 100 is shown in FIGS. 1a (front panel view), 1b (side panel view), and 1c (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 1b) can be infra-red communication port 76, access door to a secure digital (SD) memory interface 78, audio jack 80, and hand strap 82. Disposed on the bottom panel (best viewed in FIG. 1c) can be multi-pin mechanical connector 84 and hand strap clip 86.

Figure 1B:
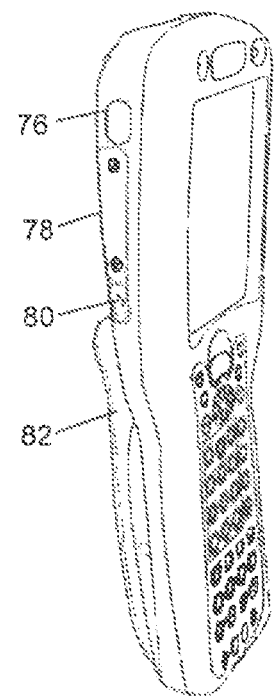
Figure 1C:
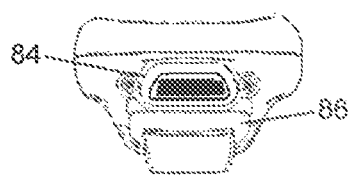

While FIGS. 1a-1c illustrate a hand held housing, a skilled artisan would appreciate the fact that other types and form factors of terminal housings are within the scope of this disclosure.

Figure 2:
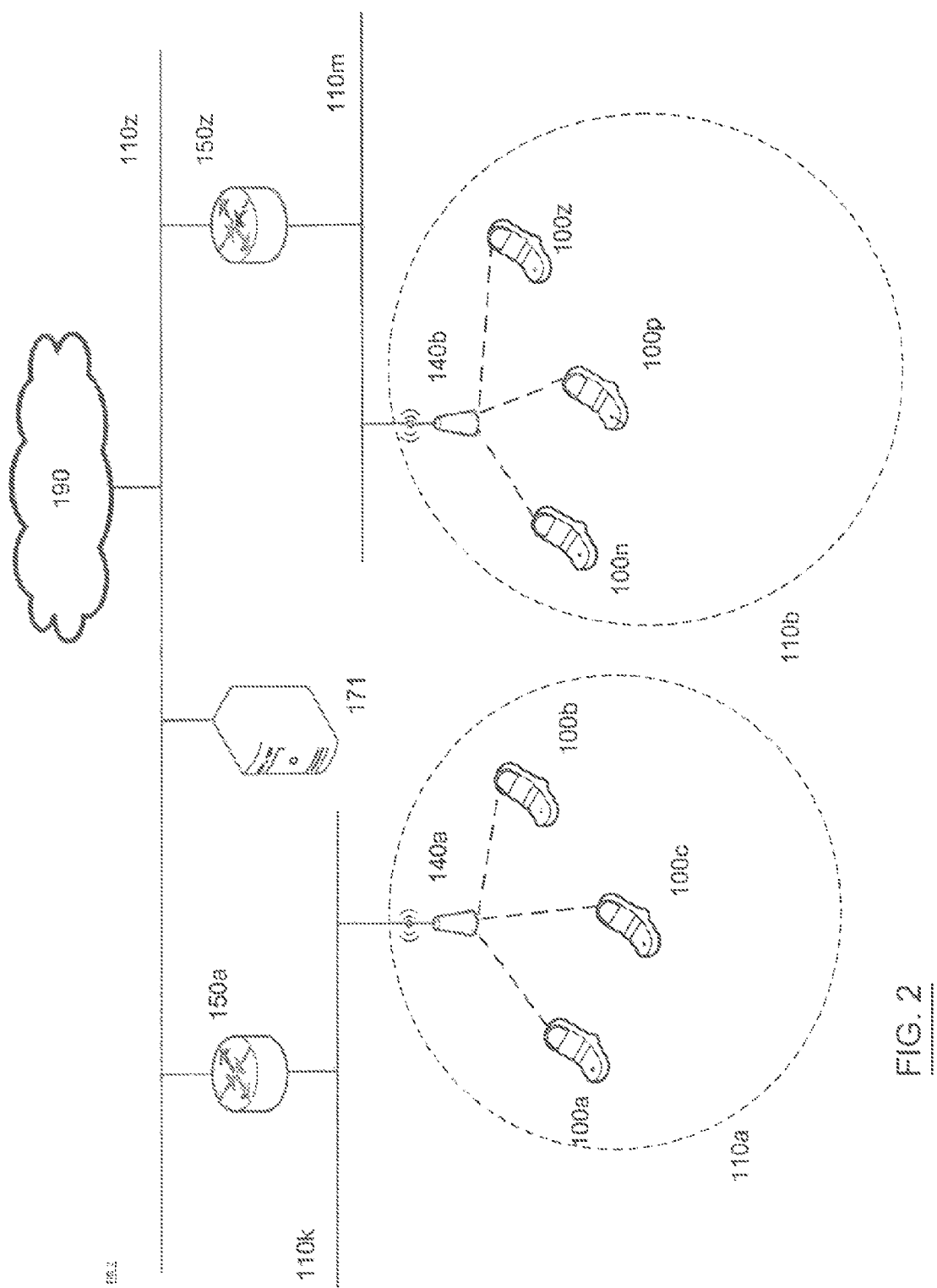
FIG. 2 depicts a network-level layout of a data collection system utilizing EIR terminals.

In a further aspect, the EIR terminal can be incorporated in a data collection system. The data collection system, schematically shown in FIG. 2, can include a plurality of EIR terminals 100a-100z in communication with a plurality of interconnected networks 110a-110z. In one aspect, the plurality of networks 110a-110z can include at least one wireless communication network. In a further aspect, an EIR terminal can comprise a communication interface which can be used by the terminal to connect to one or more networks 110a-110z. In one embodiment, the communication interface can be provided by a wireless communication interface.

The EIR terminal 100c can establish a communication session with the host computer 171. In one embodiment, network frames can be exchanged by the EIR terminal 100c and the host computer 171 via one or more routers, base stations, and other infrastructure elements. In another embodiment, the host computer 171 can be reachable by the EIR terminal 100c via a local area network (LAN). In a yet another embodiment, the host computer 171 can be reachable by the EIR terminal 100c via a wide area network (WAN). A skilled artisan would appreciate the fact that other methods of providing interconnectivity between the EIR terminal 100c and the host computer 171 relying upon LANs, WANs, virtual private networks (VPNs), and/or other types of network are within the scope of this disclosure.

In one embodiment, the communications between the EIR terminal 100c and the host computer 171 can comprise a series of HTTP requests and responses transmitted over one or more TCP connections. In one embodiment, the communications between the EIR terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tacking record for an item identified by a bar code label attached to the product.

Figure 3:
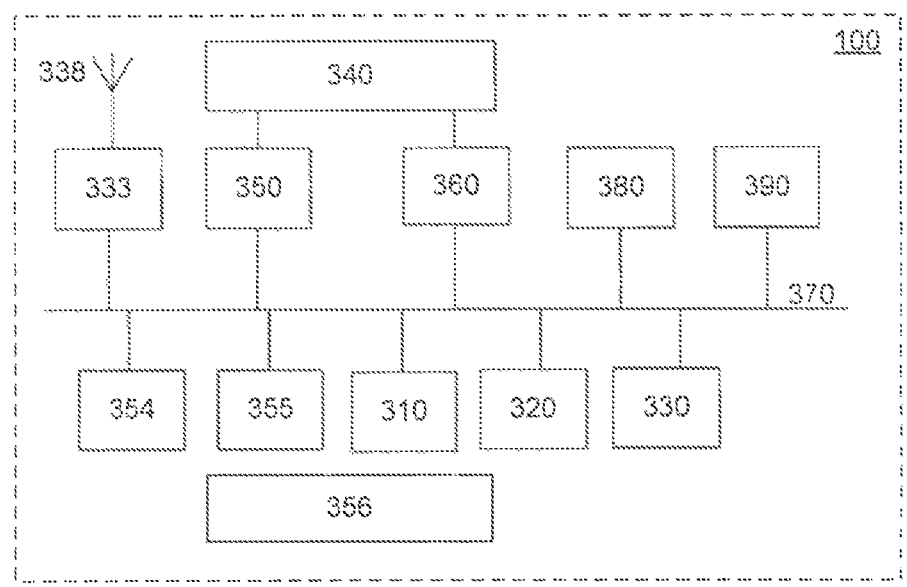
FIG. 3 depicts component-level layout of an EIR terminal.

Component-level diagram of one embodiment of an EIR terminal is now being described with references to FIG. 3. EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, the RFID terminal can be configured to read an encoded message using EIR device 330, and to output raw message data containing the encoded message. In another embodiment, the RFID terminal can be configured to read an encoded message using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, EIR terminal 100 can further comprise an RFID reading device 333. EIR terminal 100 can be configured to read RFID tags containing decoded messages. In one embodiment, the RFID terminal can be configured to read, using RFID reading device 333, an RFID tag containing an encoded message, and to output raw message data containing the encoded message. In another embodiment, the RFID terminal can be configured to read, using RFID reading device 333, an RFID tag containing an encoded message, and to output decoded message data corresponding to the encoded message.

In a further aspect, the RFID reading device can comprise an antenna 338. In one embodiment, the antenna 338 of FIG. 3 can be provided by a metamaterial (MTM) antenna.

Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, $\beta$), where E is the electrical field, H is the magnetic field, and $\beta$ is the phase velocity) exhibiting a positive refractive index, a metamaterial due to its artificial structure can exhibit a negative refractive index and follow the left-hand rule for the trio (E, H, $\beta$). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

Figure 4A:
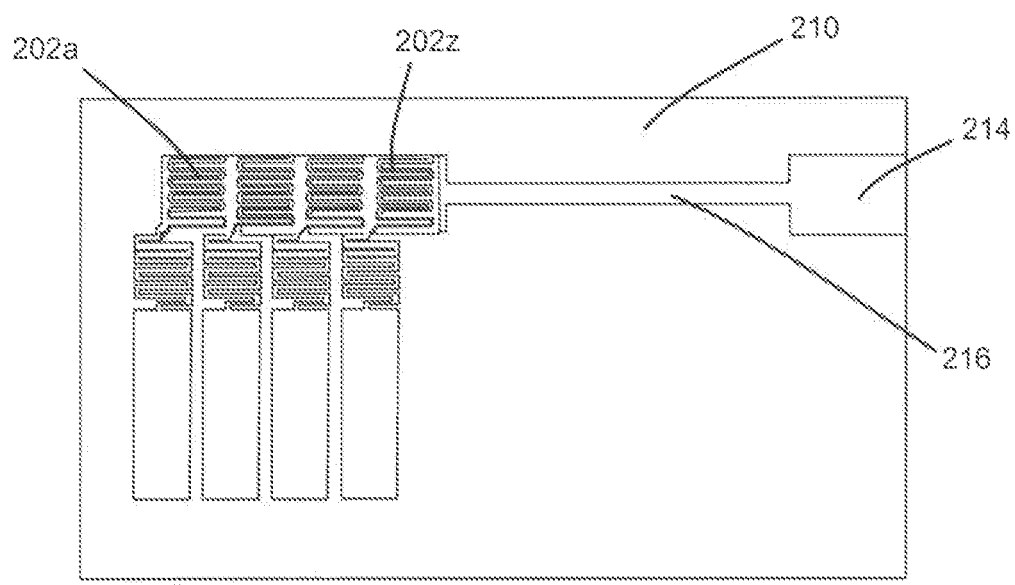
Figure 4B:
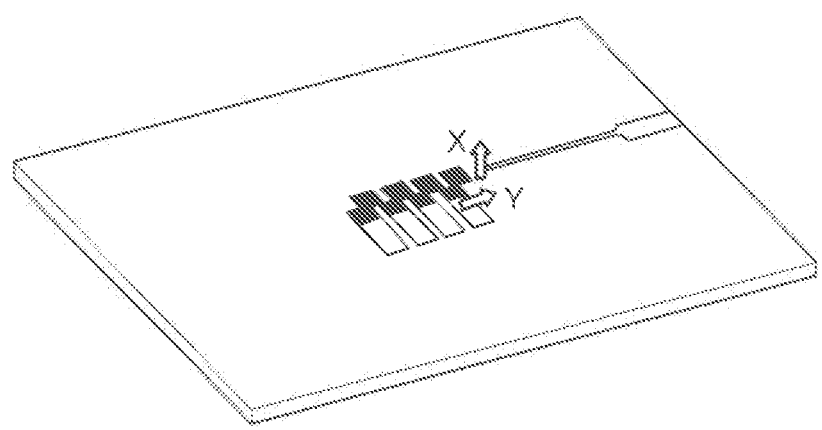

In one embodiment, antenna 338 of FIG. 3 can be provided by a multiple cell MTM antenna shown in FIGS. 4a (top view) and 4b (3D view). Antenna 338 can comprise one or more conductive cell patches 202a-202z that can be mounted on a dielectric substrate, provided, for example, by a printed circuit board (PCB) 210. Conductive cell patches 202a-202z can be spatially separated so that capacitive couplings between adjacent cell patches can be created. Also disposed on the dielectric substrate 210 can a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202a-202b. A skilled artisan would appreciate the fact that MTM antennas having two or more conductive feed lines are within the scope of this disclosure. A ground plane can be provided by a metallic layer disposed on the bottom side of PCB 210 (not shown in FIG. 4a). Each cell patch can be connected to the ground plane by a via.

In one embodiment, antenna 338 of FIG. 3 can be provided by a multiple cell MTM antenna shown in FIGS. 5a (top view), 5b (bottom view), and 5c (3D view). Antenna 338 can comprise one or more conductive cell patches 302a-302z that can be mounted on a dielectric substrate, provided, for example, by a printed circuit board (PCB) 310. Conductive cell patches 302a-302z can be spatially separated so that capacitive couplings between adjacent cell patches can be created. Also disposed on the top surface of dielectric substrate 310 can be a feed pad 314 that can be provided, e.g., by a metallic plate and can be connected to a conductive feed line 316. Conductive feed line 316 can be provided, e.g., by a metallic strip, and can be located close but separately from conductive cell patches 302a-302z. A skilled artisan would appreciate the fact that MTM antennas having one or more conductive feed lines are within the scope of this disclosure. At least one conductive feed line can comprise a feed line tuner 322 provided by a conductive strip having a curved line form or an open polygon line form. A feed line tuner can be used to adjust resonant frequency of antenna 338 as explained herein infra.

In one embodiment, feed pad 314 can be electrically coupled to coaxial cable connector 315. In one embodiment, shown in FIG. 5c, coaxial cable connector 315 can be connected from the bottom side of antenna 338. In another embodiment, coaxial cable connector 315 can be connected from a lateral side of antenna 338. In a yet another embodiment, feed pad 314 can be electrically coupled to a twisted cable.

Also disposed on the top surface of dielectric substrate 310 can be one or more ground planes 312a-312z provided, e.g., by one or more metallic plates.

One or more conductive cell patches 302a-302z can be connected by one or more vias 342a-342z to one or more conductive via lines 352a-352z disposed on the bottom surface of dielectric substrate 310. At least one conductive via line 352a-352z can comprise a via line tuner 354a-354z provided by a conductive strip having a curved line form or an open polygon line form. A via line tuner can be used to adjust resonant frequency of antenna 338 as explained herein infra. Also disposed on the bottom surface of dielectric substrate 310 can be a bottom ground plane 360.

Figure 6A:
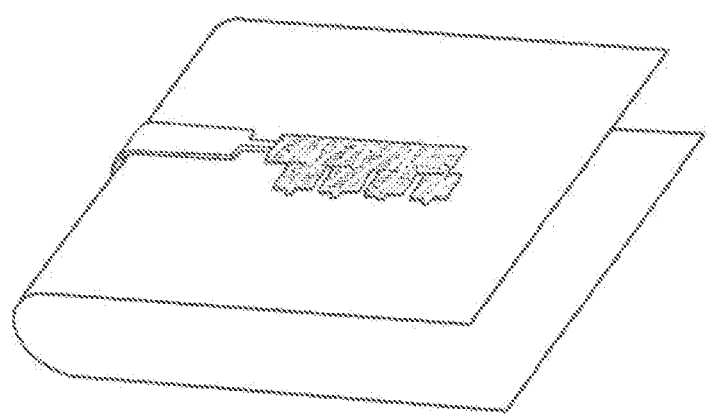
Figure 6B:
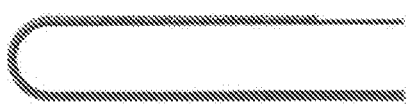

In one embodiment, dielectric substrate 310 can have a folded plane form-factor, as shown in FIGS. 6a (3D view) and 6b (side view). The gap between the two ends of the folded plane can be unfilled (air gap) or can be filled with a dielectric material. The folded design can advantageously offer extra air gap (or can be filled with other material). In another aspect, due to the folded design, a multi-layer MTM design can be implemented without inter-connections.

Figure 7B:
Figure 7A:
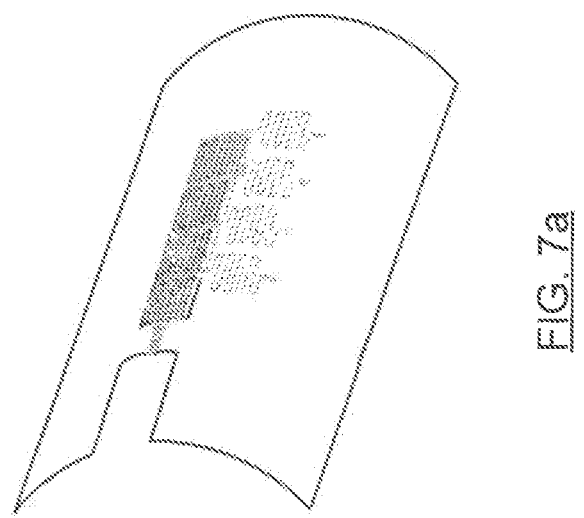

In one embodiment, dielectric substrate 310 can have a curved plane form-factor, as shown in FIGS. 7a (3D view) and 7b (side view). The gap between the two ends of the folded plane can be unfilled (air gap) or can be filled with a dielectric material. A skilled artisan would appreciate the fact that MTM antennas mounted on dielectric substrates having a more complex form factors (e.g., a 3D surface) are within the scope of this disclosure. A curved surface can advantageously provide additional tune to the antenna directivity. A more complicated 3D surface can be constructed by folding and wrapping on object having a desired shape, such as a cone.

Figure 8A:
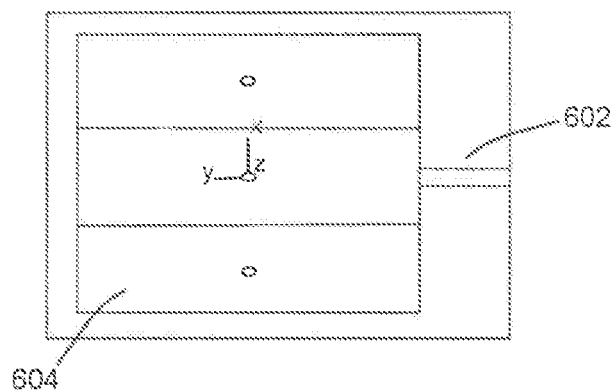
Figure 8B:
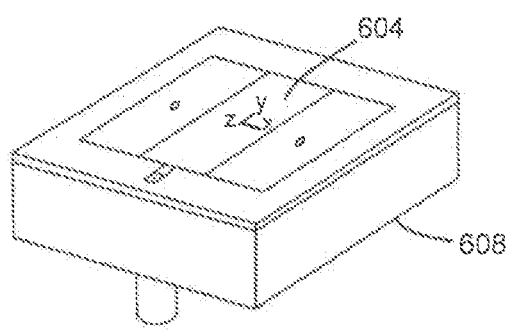

In one embodiment, antenna 338 of FIG. 1 can be provided by a mushroom-shape MTM antenna shown in FIGS. 8a (top view) and 8b (3D view). In one embodiment, the gap between the feed line 602 and the top patch 604 can form a capacitor (left-hand); the via between the top patch 604 and the bottom ground 608 can form an inductance (left-hand).

In a further aspect, antenna 338 of FIG. 1 can be broadband, ultrawideband (UWB), or multiband (MB). Antenna 338 of FIG. 1 can be designed to support the desired functionality and characteristics. Antenna size, resonant frequencies, bandwidth, and matching properties can be controlled by changing the antenna design parameters including number and size of cells, the gap between the cells, the gap between the feed line and the cells, the size (radius and height) and location of vias, the length and width of the feed line, the length and width of the via line, the material and thickness of the substrate, and various other dimensions and layouts.

Antenna size and resonant frequency can be controlled by the patch shape and size. Cell patches can have a rectangular, triangular, circular or other shape. The most efficient antenna area usage can be provided by a rectangular shape. In a further aspect, the resonant frequency can be sensitive to the via line length. To control the via line length, a via line tuner can be provided having a straight line form, a curved line form, or an open polygon line form. The via line length can be used to adjust resonant frequency due to its left hand inductive character. In a further aspect, the resonant frequency can be sensitive to the feed line length and the size of the gap between a feed line and a cell patch. To control the feed line length, a feed line tuner can be provided having a straight line form, a curved line form, or an open polygon line form. The feed line length can be used to adjust resonant frequency due to its left hand capacitive character. In a further aspect, the resonant frequency can be sensitive to the thickness of the substrate on which the antenna components are disposed. The substrate thickness can range from 0.1 mm to 150 mm depending upon the substrate material. Various materials having different permittivity can be used, for example, but not limited to, FR4 ($\in_r$=4.4), Getek ($\in_r$=4.0), Polyimide ($\in_r$=3.5), Polyester ($\in_r$=3.9), Arlon AD250 ($\in_r$=2.5), RT/duroid 5880 ($\in_r$=2.2), etc.

In another aspect, an antenna can comprise a single cell or multiple cells. A multi-cell antenna can have a smaller resonant frequency shift as compared to a single cell antenna, but also can have a higher peak gain due to a better beam concentration.

In another aspect, the antenna return loss can be controlled by the radius of one or more vias that connect the cell patches and the ground plane: vias having smaller radius can provide a better return loss.

In one embodiment, the communication interface 340 and RFID reading device can share one MTM antenna 338.

In a further aspect, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, EIR terminal 100 can transmit information to a passive RFID tag by modulating an RF signal in the 860-960 MHz frequency range. An RFID tag can receive both information and operating energy from the RF signal transmitted by EIR terminal 100. EIR terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the EIR terminal 100. In one embodiment, the RFID tag can modulate the reflection coefficient of its antenna only responsive to receiving an RFID signal from EIR terminal 100.

In a further aspect, EIR terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

EIR terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by EIR terminal 100.

In another aspect, the communication link between EIR terminal 100 and an RFID tag can be half-duplex, meaning that the RFID tag is not required to demodulate EIR terminal's commands while backscattering. A half-duplex system means communication in both directions, but only one direction at a time (not simultaneously). Typically, once a party begins receiving a signal, it must wait for the transmitter to stop transmitting, before replying.

In another aspect, EIR terminal can establish one or more sessions with one or more RFID tags. An RFID tag can support at least one session-dependent flag for every session. The session-dependent flag can have two states. An RFID tag can invert a session-dependent flag responsive to receiving a command from EIR terminal 100. Tag resources other than session-dependent flags can be shared among sessions. In another aspect, an RFID tag can support a selected status flag indicating that the tag was selected by EIR terminal 100.

Responsive to receiving an interrogation signal transmitted by EIR terminal 100, an RFID tag can transmit a response signal back to EIR terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, EIR terminal can implement EPC™ Class-1 Generation-2 UHF RFID Protocol for Communications at 860 MHz-960 MHz by EPCglobal. EIR terminal 100 can interrogate RFID tags using the commands described herein infra.

Select command can be used by EIR terminal 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by EIR terminal 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscatering a 16-bit random number. If a non-zero value is selected, the tag can load the selected random integer into its slot counter and change its state to Arbitrate.

Responsive to receiving the tag transmission, EIR terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, EIR terminal can send a QueryAdjust command causing the tag to invert its Inventoried flag and to transition to Ready state.

Access command set can be used by EIR terminal 100 for communicating with (reading from and writing to) a tag. An individual tag must be uniquely identified prior to access. Access command set includes the following commands:

ReqRn command can be used by EIR terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by EIR terminal 100 to read tag's Reserved, EPC, TID and User memory;

Write command can be used by EIR terminal 100 to write to tag's Reserved, EPC, TID and User memory;

Kill command can be used by EIR terminal 100 to permanently disable a tag;

Lock command can be used by EIR terminal 100 to lock passwords preventing subsequent read or write operations; lock individual memory banks preventing subsequent write operations; permanently lock the lock status of passwords or memory banks;

Access command can be used by EIR terminal 100 to cause a tag having a non-zero access password to transition from Open to Secured state.

A skilled artisan would appreciate the fact that other methods of interrogating RFID tags by EIR terminal 100 are within the scope of this disclosure.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:
a microprocessor;
a memory communicatively coupled to said microprocessor;
a radio frequency identifier (RFID) reading device, said RFID reading device configured to perform at least one of: outputting raw message data containing an encoded message and outputting decoded message data corresponding to an encoded message;
wherein said RFID reading device comprises an antenna having a composite right- and left-handed (CRLH) structure;
wherein said antenna comprises one or more spatially separated conductive cell patches mounted on a dielectric substrate, a feed pad mounted on said dielectric substrate, one or more conductive feed lines connected to said feed pad, and one or more ground planes mounted on said dielectric substrate;
wherein said one or more conductive feed lines are spatially separated from said one or more conductive cell patches; and
wherein said one or more conductive cell patches are connected by one or more vias to one or more conductive via lines.

A2. The EIR terminal of A1, further comprising an EIR device selected from the group consisting of: a bar code reading device and a card reading device, said EIR device configured to perform at least one of: outputting raw message data containing an encoded message and outputting decoded message data corresponding to an encoded message.

A3. The EIR terminal of A1, wherein at least one of said one or more conductive via lines comprises a via line tuner.

A4. The EIR terminal of A1, wherein at least one of said one or more conductive feed lines comprises a feed line tuner.

A5. The EIR terminal of A1, comprising two or more ground planes;
wherein at least two of said two or more ground planes are disposed on opposite surfaces of said dialectic substrate.

A6. The EIR terminal of A1, wherein said via line tuner is configured to adjust a resonant frequency of said antenna.

A7. The EIR terminal of A1, wherein said feed line tuner is configured to adjust a resonant frequency of said antenna.

A8. The EIR terminal of A1, wherein said dielectric substrate has a folded plane form factor.

A9. The EIR terminal of A1, wherein said dielectric substrate is provided by a printed circuit board.

A10. The EIR terminal of A1, wherein said antenna is configured to support one or more frequency bands.

A11. The EIR terminal of A1, wherein at least one of said conductive cell patches has one of: a rectangular shape, a triangular shape, a circular shape.

A12. The EIR terminal of A1, wherein said dielectric substrate has a form factor selected from the group consisting of: a curved plane, a folded plane, a 3D surface.

A13. The EIR terminal of A1, wherein said feed pad is electrically coupled to a coaxial cable connector.

A14. The EIR terminal of A1, wherein said feed pad is electrically coupled to a twisted cable connector.

We claim:

1. An apparatus comprising:
a microprocessor;
a memory communicatively coupled to said microprocessor; and
a radio frequency identification (RFID) reader;
wherein said RFID reader comprises an antenna;
wherein said antenna comprises:
one or more spatially separated conductive cell patches mounted on a dielectric substrate,
a feed pad mounted on said dielectric substrate,
one or more conductive feed lines connected to said feed pad so that the feed pad provides power to at least one of the one or more conductive feed lines, wherein at least one of the one or more conductive feed lines comprises a microstrip line that is disposed between the one or more spatially separated conductive cell patches, and
one or more ground planes mounted on said dielectric substrate;
wherein said one or more conductive feed lines are spatially separated from said one or more conductive cell patches; and
wherein each of said one or more conductive cell patches are connected by one or more vias to one or more conductive via lines.

2. The apparatus of claim 1, further comprising an EIR device selected from the group consisting of: a bar code reading device and a card reading device, said EIR device configured to perform at least one of: outputting raw message data containing an encoded message and outputting decoded message data corresponding to an encoded message.

3. The apparatus of claim 1, wherein at least one of said one or more conductive via lines comprises a via line tuner.

4. The apparatus (EIR) terminal of claim 1, wherein at least one of said one or more conductive feed lines comprises a feed line tuner.

5. The apparatus of claim 1, comprising two or more ground planes; wherein at least two of said two or more ground planes are disposed on opposite surfaces of said dialectic substrate.

6. The apparatus of claim 3, wherein said via line tuner is configured to adjust a resonant frequency of said antenna.

7. The apparatus of claim 4, wherein said feed line tuner is configured to adjust a resonant frequency of said antenna.

8. The apparatus of claim 1, wherein said dielectric substrate has a folded plane form factor.

9. The apparatus of claim 1, wherein said dielectric substrate is provided by a printed circuit board.

10. The apparatus of claim 1, wherein said antenna is configured to support one or more frequency bands.

11. The apparatus of claim 1, wherein at least one of said conductive cell patches has one of: a rectangular shape, a triangular shape, a circular shape.

12. The apparatus of claim 1, wherein said dielectric substrate has a form factor selected from the group consisting of: a curved plane, a folded plane, a 3 D surface.

13. The apparatus of claim 1, wherein said feed pad is electrically coupled to a coaxial cable connector.

14. The apparatus of claim 1, wherein said feed pad is electrically coupled to a twisted cable connector.

* * * * *